(12) United States Patent
Meisenburg et al.

(10) Patent No.: US 7,446,142 B2
(45) Date of Patent: Nov. 4, 2008

(54) THERMAL COATING MATERIALS AND COATING MATERIALS THAT CAN BE CURED THERMALLY AND USING ACTINIC RADIATION AND THE USE THEREOF

(75) Inventors: Uwe Meisenburg, Duisburg (DE); Hubert Baumgart, Münster (DE); Daniel Kussel, Münster (DE)

(73) Assignee: BASF Coatings AG, Munster (DE)

( * ) Notice: Subject to any disclaimer, the term of this patent is extended or adjusted under 35 U.S.C. 154(b) by 208 days.

(21) Appl. No.: 10/483,698

(22) PCT Filed: Aug. 10, 2002

(86) PCT No.: PCT/EP02/08983

§ 371 (c)(1),
(2), (4) Date: Jan. 13, 2004

(87) PCT Pub. No.: WO03/016411

PCT Pub. Date: Feb. 27, 2003

(65) Prior Publication Data

US 2004/0235997 A1    Nov. 25, 2004

(30) Foreign Application Priority Data

Aug. 16, 2001    (DE) ............... 101 40 155

(51) Int. Cl.
*C08K 3/18* (2006.01)
(52) U.S. Cl. .............. 524/431; 524/432; 524/437; 524/556
(58) Field of Classification Search ........... 524/431, 524/432, 437, 556
See application file for complete search history.

(56) References Cited

U.S. PATENT DOCUMENTS

| | | | | |
|---|---|---|---|---|
| 4,652,470 | A * | 3/1987 | Das et al. ............... | 427/407.1 |
| 5,716,678 | A * | 2/1998 | Rockrath et al. ........ | 427/407.1 |
| 5,719,227 | A | 2/1998 | Rosenberry et al. | |
| 5,854,301 | A | 12/1998 | Dvorchak et al. | |
| 6,022,919 | A * | 2/2000 | Komoto et al. .......... | 524/430 |
| 6,265,487 | B1 | 7/2001 | Gottis | |
| 6,291,070 | B1 | 12/2001 | Flosbach et al. | |
| 6,410,646 | B1 * | 6/2002 | Rockrath et al. ........ | 525/124 |
| 6,467,897 | B1 * | 10/2002 | Wu et al. ............... | 347/102 |
| 6,332,291 | B1 | 9/2003 | Bruchmann et al. | |
| 6,617,413 | B1 | 9/2003 | Bruchmann et al. | |
| 6,663,952 | B1 | 12/2003 | Mehnert | |
| 6,713,559 | B1 * | 3/2004 | Armbrust et al. ........ | 525/100 |
| 7,122,595 | B1 * | 10/2006 | Ott et al. ............... | 524/502 |
| 2002/0077388 | A1 | 6/2002 | Meyer et al. | |
| 2002/0077407 | A1 | 6/2002 | Meyer et al. | |
| 2002/0094439 | A1 | 7/2002 | Edelmann et al. | |
| 2002/0098243 | A1 | 7/2002 | Edelmann et al. | |
| 2002/0198314 | A1 | 12/2002 | Meisenburg et al. | |
| 2003/0018539 | A1 | 1/2003 | La Poutre et al. | |

| | | |
|---|---|---|
| 2003/0091833 A1 | 5/2003 | Frieling et al. |

FOREIGN PATENT DOCUMENTS

| | | |
|---|---|---|
| DE | 10027268 | 12/1991 |
| DE | 19908018 | 8/2000 |
| DE | 19920799 | 11/2000 |
| DE | 19930067 | 1/2001 |
| DE | 19930664 | 1/2001 |
| DE | 19930665 | 1/2001 |
| DE | 19924674 | 6/2001 |
| DE | 10001510 | 7/2001 |
| DE | 10047989 | 4/2002 |
| DE | 10055549 | 5/2002 |
| EP | 1199335 | 10/2000 |
| EP | 1199336 | 10/2000 |
| EP | 1195416 | 8/2001 |
| EP | 1195417 | 8/2001 |
| WO | WO97/16479 | 5/1997 |

(Continued)

OTHER PUBLICATIONS

Abstract for DE10001510 from EPO, Jul. 26, 2001.

(Continued)

*Primary Examiner*—Bernard Lipman
(74) *Attorney, Agent, or Firm*—Harness, Dickey & Pierce, P.L.C.

(57) ABSTRACT

Coating materials curable thermally, or thermally and with actinic radiation, comprising
(A) binder selected from the group consisting of random, alternating and block, linear, branched and comb polyaddition resins, polycondensation resins, and addition (co) polymers of olefinically unsaturated monomers, curable physically, thermally, with actinic radiation, and thermally and with actinic radiation;
and
(B) nanoparticles selected from the group consisting of nanoparticles modified with at least one compound of the general formula I:

$$[(S-)_o\text{-L-}]_n\text{-M-}(-X-R)_{m-n},\qquad (I)$$

where the indices and the variables have the following meanings:
S is a reactive functional group having at least one bond which can be activated with actinic radiation;
L is at least one divalent organic linking group;
X independently at each occurrence is an oxygen atom, sulfur atom or >$NR^1$, where $R^1$=hydrogen atom or alkyl group having from 1 to 4 carbon atoms;
M is a metal atom;
R is a monovalent organic radical;
o is an integer from 1 to 5;
m is 3 or 4;
n is 1 or 2 if m=3, and
n is 1, 2 or 3 if m=4,
and their use for producing clearcoat systems and multicoat color and/or effect paint systems or as adhesives and sealing compounds.

29 Claims, No Drawings

FOREIGN PATENT DOCUMENTS

| | | | |
|---|---|---|---|
| WO | WO 9716479 A1 * | 5/1997 | |
| WO | WO 9840442 A1 * | 9/1998 | |
| WO | WO98/51747 | 11/1998 | |
| WO | WO00/22039 | 4/2000 | |
| WO | WO 0050519 A1 * | 8/2000 | |
| WO | WO 116242 A1 * | 3/2001 | |

OTHER PUBLICATIONS

Abstract for DE10027268 from EPO, Dec. 13, 2001.
U.S. Appl. No. 09/889,818, filed Jul. 20, 2001, Ott et al.
U.S. Appl. No. 09/926,532, filed Nov. 16, 2001, Meisenburg et al.
U.S. Appl. No. 10/018,106, filed Jan. 11, 2002, Allard et al.
U.S. Appl. No. 10/018,351, filed Dec. 7, 2001, Bremser.
U.S. Appl. No. 10/018,352, filed Dec. 7, 2001, Bremser.
U.S. Appl. No. 10/018,703, filed Dec. 13, 2001, Bremser.
U.S. Appl. No. 10/380,916, filed Mar. 18, 2003, Baumgart et al.
U.S. Appl. No. 10/398,894, filed Apr. 9, 2003, Baumgart et al.

* cited by examiner

THERMAL COATING MATERIALS AND COATING MATERIALS THAT CAN BE CURED THERMALLY AND USING ACTINIC RADIATION AND THE USE THEREOF

CROSS REFERENCE TO RELATED APPLICATIONS

This application is a National Phase Application of Patent Application PCT/EPO2/08983 filed on 10 Aug. 2002, which claims priority to DE 101 40 155.8, filed on 16 Aug. 2001.

The present invention relates to novel coating materials which are curable thermally, or thermally and with actinic radiation. The present invention also relates to the use of the novel coating materials curable thermally, or thermally and with actinic radiation, for producing single-coat and multicoat clearcoat systems and color and/or effect paint systems. The present invention additionally relates to the use of the novel coating materials curable thermally, and with actinic radiation, as adhesives and sealing compounds for producing adhesive films and seals.

Color and/or effect coatings of motor vehicle bodies, especially automobile bodies, nowadays consist preferably of a plurality of coating films which are applied atop one another and have different properties.

For example, an electrodeposition coat (electrocoat) as primer, a primer-surfacer coat or antistonechip primer, a basecoat, and a clearcoat are applied in succession to a substrate. In this system, the electrocoat serves in particular to protect the sheet metal against corrosion. By those skilled in the art it is often also referred to as the primer. The primer-surfacer coat serves to cover unevennesses in the substrate, and because of its elasticity imparts stonechip resistance. Where appropriate, the primer-surfacer coat may also serve to reinforce the hiding power and to deepen the shade of the paint system. The basecoat contributes the colors and/or optical effects. The clearcoat is used to intensify the optical effects and to protect the paint system against mechanical and chemical damage. Basecoat and clearcoat are frequently also referred to collectively as the topcoat. For further details, refer to Römpp Lexikon Lacke und Druckfarben, Georg Thieme Verlag, Stuttgart, New York, 1998, pages 49 and 51, "automotive finishes". In the text below, these multicoat paint systems are referred to as multicoat color and/or effect paint systems.

On account of their size and the fact that they almost always subsequently receive logos, inscriptions, blocks of color and/or images, commercial vehicles are frequently provided only with a pigmented coating, known as a solid-color topcoat.

More recently, the clearcoats in particular have been produced from clearcoat materials which are curable thermally and with actinic radiation. Here and below, actinic radiation means electromagnetic radiation, such as near infrared, visible light, UV radiation or x-rays, especially UV radiation, and corpuscular radiation, such as electron beams. Combined curing by means of heat and actinic radiation is also referred to by those skilled in the art as dual cure.

Dual-cure coating materials, especially dual-cure clearcoat materials, possess the key advantage that, even in the shadow zones of three-dimensional substrates of complex shape, such as autobodies, radiators or electrical wound articles, and even in the absence of optimum—in particular, complete—exposure of the shadow zones to actinic radiation, they provide coatings whose profile of performance properties at least comes close to that of the coatings outside of the shadow zones. As a result, the coatings in the shadow zones are also no longer readily damaged by mechanical and/or chemical attack, as may occur, for example, on the production line during the installation of further components of motor vehicles into the coated bodies.

Dual-cure coating materials containing unmodified, substantially hydrophilic nanoparticles based on silicon dioxide, and their use to produce high-quality multicoat color and/or effect paint systems, are known, for example, from the German patent application DE 199 20 806 A1. The known dual-cure coating materials provide coatings which feature particularly high scratch resistance. Their overbake stability and yellowing stability, however, require further development. Moreover, they still do not have the surface hardness that is needed for trouble-free sandability and polishability. Moreover, they still require improvement in their resistance to moisture exposure, such as occurs when transit protection films are used during the delivery of new cars, for example.

Thermally curable coating materials which comprise silica-based nanoparticles modified with alcohols or alkylchlorosilanes are known from the American patent U.S. Pat. No. 4,652,470 A. The known coating materials are used in wet-on-wet techniques to produce multicoat color and/or effect paint systems and exhibit less of a tendency toward strike-in and toward sagging than nanoparticle-free coating materials. The patent contains no indications that the problems outlined above might be overcome by using nanoparticles.

From the VILF Papers series of the Verband der Ingenieure des Lack- und Farbenfachs e.V. [Varnish and paint engineers association, VILF], Volume 3, S. Frahn, V. Valter, T. Ladwig, M. Ettinger and J. Meyer, "Neue modifizierte hochdisperse Siliciumdioxide für strahlenhärtende Lacksysteme" [New modified highly disperse silicas for radiation-curing paint systems], pages 89 to 91, discloses coating systems (100% systems) which are curable with actinic radiation and contain hydrophilic, methacryloyloxypropyltrimethoxysilane-modified nanoparticles based on silica, in an amount of from 5 to 16% by weight. The known coating materials provide coatings having an improved scratch resistance. The article does not give indications of any improvement in surface hardness, overbake stability, yellowing stability, or resistance to moisture exposure of thermally curable or dual-cure coating materials as a result of the modified nanoparticles.

It is an object of the present invention to find novel coating materials, curable thermally or thermally and with actinic radiation, which provide novel coatings which no longer have the disadvantages of the prior art. In particular, the novel coatings should have an overbake stability and yellowing stability which exceed those of the prior art. Moreover, they should have a surface hardness which is needed for trouble-free sandability and polishability. Furthermore, they are to have an improved resistance to moisture exposure, such as occurs, for example, when transit protection films are used during the delivery of new vehicles. Furthermore, the novel coatings should have the same advantageous properties as the coatings known to date, or exceed them. All this should be possible to achieve without great effort, using simple measures instead.

The invention accordingly provides the novel coating materials curable thermally, or thermally and with actinic radiation, comprising (A) at least one binder selected from the group consisting of random, alternating and block, linear, branched and comb polyaddition resins, polycondensation resins, and addition (co)polymers of olefinically unsaturated monomers, curable physically, thermally, with actinic radiation, and thermally and with actinic radiation;

and (B) nanoparticles selected from the group consisting of nanoparticles modified with at least one compound of the general formula I:

     (I), where the indices and the variables have the following meanings:

S is a reactive functional group having at least one bond which can be activated with actinic radiation;

L is at least one divalent organic linking group;

X independently at each occurrence is an oxygen atom, sulfur atom or >$NR^1$, where $R^1$=hydrogen atom or alkyl group having from 1 to 4 carbon atoms;

M is a metal atom;

R is a monovalent organic radical;

o is an integer from 1 to 5;

m is 3 or 4;

n is 1 or 2 if m=3, and n is 1, 2 or 3 if m=4.

In the text below, the novel coating materials curable thermally, or thermally and with actinic radiation, are referred to as "coating materials of the invention".

Further subject matter of the invention will emerge from the description.

In the light of the prior art it was surprising and unforeseeable for the skilled worker that the object on which the present invention is based could be achieved by the inventive use of the modified nanoparticles (B). A particular surprise was that the nanoparticles (B) for inventive use actually had an effect on properties such as overbake stability, yellowing stability, and resistance to moisture exposure of coatings cured thermally, or thermally and with actinic radiation.

Entirely surprising was that the coating materials of the invention could also be used as adhesives and sealing compounds for producing adhesive films and seals.

The essential constituent of the coating materials of the invention are the nanoparticles (B).

The nanoparticles (B) are preferably selected from the group consisting of nanoparticles based on silica, alumina, zinc oxide, zirconium oxide, and the polyacids and heteropolyacids of transition metals, preferably of molybdenum and tungsten, having a primary particle size <50 nm, more preferably from 5 to 50 nm, in particular from 10 to 30 nm. The hydrophilic nanoparticles (B) preferably have no flatting effect. It is particularly preferred to use silica-based nanoparticies (B).

Particular preference is given to using hydrophilic pyrogenic silicas which are nonporous, whose agglomerates and aggregates have a chainlike structure, and which are preparable by the flame hydrolysis of silicon tetrachloride in an oxyhydrogen flame. They are sold, for example, by Degussa under the brand name Aerosil®. Particular preference is also given to using precipitated waterglasses, such as nanohectorites, which are sold, for example, by Südchemie under the brand name Optigel® or by Laporte under the brand name Laponite®.

The nanoparticles (B), particularly their surface, are modified with at least one, especially one, compound of the general formula (I). The modification may have been effected by means of physical adsorption of the compounds (I) onto the surface of the nanoparticles (B) and/or by chemical reaction of the compounds I with suitable reactive functional groups on the surface of the nanoparticles (B). Preferably, the modification takes place by way of chemical reactions.

In the general formula (I), the variable M stands for a metal or nonmetal atom, particularly boron, aluminum, gallium or silicon, especially silicon.

The variables X stand independently of one another for an oxygen atom, sulfur atom and/or group >$NR^1$, in which $R^1$ is an alkyl group of 1 to 4 carbon atoms, especially methyl, ethyl, propyl or n-butyl. Preferably, X is an oxygen atom.

R stands for a monovalent organic radical. The monovalent radical R may be substituted or unsubstituted; preferably, it is unsubstituted. It may be aromatic, aliphatic or cycloaliphatic. A monovalent radical R is regarded as being aromatic if X is connected directly to the aromatic radical. This rule is to be applied analogously to the aliphatic and cycloaliphatic radicals. Preference is given to using linear or branched, especially linear, aliphatic radicals. Lower aliphatic radicals are preferred; the above-described aliphatic radicals $R^1$ are particularly preferred. Of these, very particular preference is given to using the methyl group.

The variable L stands for an at least divalent, especially divalent, organic linking group.

Examples of suitable divalent organic linking groups L are aliphatic, heteroatom-containing, aliphatic, aromatic, cycloaliphatic and aromatic-cycloaliphatic hydrocarbon radicals, such as (1) substituted or unsubstituted, preferably unsubstituted, linear or branched, preferably linear, alkanediyl radicals having from 4 to 30, preferably from 5 to 20, and in particular 6, carbon atoms, which within the carbon chain may also contain cyclic groups, especially trimethylene, tetramethylene, pentamethylene, hexamethylene, heptamethylene, octamethylene, nonane-1,9-diyl, decane-1,10-diyl, undecane-1,11-diyl, dodecane-1,12-diyl, tridecane-1,13-diyl, tetradecane-1,14-diyl, pentadecane-1,15-diyl, hexadecane-1,16-diyl, heptadecane-1,17-diyl, octadecane-1,18-diyl, nonadecane-1,19-diyl or eicosane-1,20-diyl, preferably tetramethylene, pentamethylene, hexamethylene, heptamethylene, octamethylene, nonane-1,9-diyl, decane-1,10-diyl, 2-heptyl-1-pentylcyclohexane-3,4-bis(non-9-yl), cyclohexane-1,2-, -1,4- or -1,3-bis(methyl), cyclohexane-1,2-, 1,4- or 1,3-bis(eth-2-yl), cyclohexane-1,3-bis(prop-3-yl) or cyclohexane-1,2-, -1,4- or -1,3-bis(but-4-yl);

(2) divalent polyester radicals comprising repeating polyester units of the formula —(—CO—($CHR^2$)$_p$—$CH_2$—O—)—. The index p here is preferably from 4 to 6 and the substituent $R^2$=hydrogen or an alkyl, cycloalkyl or alkoxy radical. No substituent contains more than 12 carbon atoms;

(3) linear polyether radicals, preferably having a number-average molecular weight of from 400 to 5 000, in particular from 400 to 3 000, which are derived from poly(oxyethylene) glycols, poly(oxypropylene) glycols, and poly(oxybutylene)glycols;

(4) linear siloxane radicals, such as are present, for example, in silicone rubbers; hydrogenated polybutadiene or polyisoprene radicals, random or alternating butadiene-isoprene copolymer radicals or butadiene-isoprene graft copolymer radicals which may also contain copolymerized styrene, and ethylene-propylene-diene radicals;

(5) phen-1,4-, -1,3- or -1,2-ylene, naphth-1,4-, -1,3-, -1,2-, -1,5- or -2,5-ylene, propane-2,2-di(phen-4'-yl), methanedi(phen-4'-yl), biphenyl-4,4'-diyl or 2,4- or 2,6-tolylene; or (6) cycloalkanediyl radicals having 4 to 20 carbon atoms, such as cyclobutane-1,3-diyl, cyclopentane-1,3-diyl, cyclohexane-1,3- or -1,4-diyl, cycloheptane-1,4-diyl, norbornane-1,4-diyl, adamantane-1,5-diyl, decalindiyl, 3,3,5-trimethylcyclohexane-1,5-diyl, 1-methylcyclohexane-2,6- diyl, dicyclohexylmethane-4,4'-diyl, 1,1'-dicyclohexane-4,4'-diyl or 1,4-dicyclohexylhexane-4,4"-diyl, especially 3,3,5-trimethylcyclohexane-1,5-diyl or dicyclohexylmethane-4,4'-diyl.

Particular preference is given to using the linking groups L (1), with very particular preference being given to trimethylene, tetramethylene, pentamethylene, hexamethylene, heptamethylene or octamethylene, and especially trimethylene.

The variable S stands for a reactive functional group having at least one, especially one, bond which can be activated with actinic radiation.

In the context of the present invention, a bond which can be activated with actinic radiation is a bond which on exposure to actinic radiation becomes reactive and, together with other activated bonds of this kind, undergoes polymerization reactions and/or crosslinking reactions which proceed in accordance with free-radical and/or ionic mechanisms. Examples of suitable bonds are carbon-hydrogen single bonds or carbon-carbon, carbon-oxygen, carbon-nitrogen, carbon-phosphorus or carbon-silicon single bonds or double bonds. Of these, the carbon-carbon double bonds are particularly advantageous and are therefore used with very particular preference in accordance with the invention. For the sake of brevity, they are referred to below as "double bonds".

Accordingly, the reactive group S that is preferred in accordance with the invention contains one double bond or two, three or four double bonds. Where more than one double bond is used, the double bonds may be conjugated. In accordance with the invention, however, it is of advantage if the double bonds are present in isolation, in particular each terminally, in the group (S) in question. It is of particular advantage in accordance with the invention to use two double bonds, especially one double bond.

The bonds which can be activated with actinic radiation may be connected to the linking group L by way of carbon-carbon bonds or ether, thioether, carboxylate, thiocarboxylate, carbonate, thiocarbonate, phosphate, thiophosphate, phosphonate, thiophosphonate, phosphite, thiophosphite, sulfonate, amide, amine, thioamide, phosphoramide, thiophosphoramide, phosphonamide, thiophosphonamide, sulfonamide, imide, urethane, hydrazide, urea, thiourea, carbonyl, thiocarbonyl, sulfone or sulfoxide groups, but in particular by way of carbon-carbon bonds, carboxylate groups, and ether groups.

Particularly preferred reactive functional groups S are therefore (meth)acrylate, ethacrylate, crotonate, cinnamate, vinyl ether, vinyl ester, dicyclopentadienyl, norbornenyl, isoprenyl, isopropenyl, allyl or butenyl groups; dicyclopentadienyl ether, norbornenyl ether, isoprenyl ether, isopropenyl ether, allyl ether or butenyl ether groups; or dicyclopentadienyl ester, norbornenyl ester, isoprenyl ester, isopropenyl ester, allyl ester or butenyl ester groups, but especially methacrylate groups S.

In the general formula L, the variable o stands for an integer from 1 to 5, preferably from 1 to 4, more preferably from 1 to 3, and with particular preference 1 and 2. In particular, o is 1.

The variable m stands for 3 or 4, especially 4.

The variable n stands for 1 or 2, especially 1, if m=3.

The variable n stands for 1, 2 or 3, especially 1, if m=4.

Accordingly, the compounds I which are used with particular preference in accordance with the invention are methacryloyloxyalkyltrialkoxysilanes, especially methacryloyloxypropyltrimethoxysilanes (MEMO).

The nanoparticles (B) in question are known substances which are provided by Degussa Hüls under the designation Aerosil® 711 or Aerosil® VP R 7200 as an experimental product (cf. the VILF Papers series, Volume 3, S. Frahn, V. Valter, T. Ladwig, M. Ettinger and J. Meyer, "Neue modifizierte hochdisperse Siliciumdioxide für strahlenhärtende Lacksysteme", pages 89 to 91).

The nanoparticles (B) content of the coating materials of the invention may vary widely. Based in each case on the solids of a coating material of the invention, it is preferably from 0.1 to 20%, more preferably from 0.5 to 15%, with particular preference from 1.0 to 10%, with very particular preference from 1.5 to 8%, and in particular from 2 to 6% by weight.

For the preparation of the coating materials of the invention, the nanoparticles (B) may be processed together with the other constituents. The nanoparticles (B) may be processed as they are or in the form of pastes, particularly in the form of pastes. It is of advantage in accordance with the invention to add the nanoparticles (B) to customary and known coating materials curable thermally, or thermally and with actinic radiation, to give the coating materials of the invention. The addition is preferably made in the form of a paste.

The nanoparticle paste (B) may be aqueous, aqueous-organic, or straight organic. The choice of which variant to use is guided by the composition of the coating materials of the invention.

The nanoparticles (B) content of the nanoparticle pastes (B), based on the paste, is preferably from 5 to 80%, more preferably from 6 to 70%, with particular preference from 7 to 60%, with very particular preference from 8 to 60%, and in particular from 10 to 50% by weight.

Preference is given to using organic solvents which, under the conditions of preparing, storing, applying, and curing the coating materials of the invention, do not enter into unwanted reactions with the constituents of the coating materials of the invention. It is preferable to use organic solvents which, moreover, do not inhibit the thermal and/or actinic radiation crosslinking of the coating materials of the invention and/or do not enter into any disruptive interactions with constituents of the coating materials of the invention. The solvents may be inert or else may participate in the crosslinking reactions as reactive diluents which can be crosslinked thermally and/or with actinic radiation.

The skilled worker will be able to select suitable solvents easily on the basis of their known solvency and their reactivity. Examples of suitable solvents are known from D. Stoye and W. Freitag (editors), "Paints, Coatings and Solvents", second, completely revised edition, Wiley-VCH, Weinheim, New York, 1998, "14.9. Solvent Groups", pages 327 to 373.

The further essential constituent of the coating materials of the invention is at least one binder (A).

Binders (A) are selected from the group consisting of random, alternating and block, linear, branched and comb addition (co)polymers of ethylenically unsaturated monomers, polyaddition resins and/or polycondensation resins curable physically, thermally, or thermally and with actinic radiation. Regarding these terms, refer to Römpp Lexikon Lacke und Druckfarben, Georg Thieme Verlag, Stuttgart, New York, 1998, page 457, "polyaddition" and "polyaddition resins (polyadducts)", and also pages 463 and 464, "polycondensates", "polycondensation", and "polycondensation resins", and also pages 73 and 74, "binders".

The physically curing binders (A) contain, if any, a small number—insignificant for curing—of the above-described groups S for curing with actinic radiation and/or of the reactive functional groups for thermal crosslinking that are described below.

Where physically curing binders (A) are used, the thermally curable coating materials of the invention comprise at least one of the thermally curable constituents described below, and the dual-cure coating materials of the invention comprise at least one of the constituents described below that is curable thermally and at least one of the constituents described below that is curable with actinic radiation, and/or at least one of the dual-cure constituents described below.

Where thermally self-crosslinking binders (A) are used, the dual-cure coating materials of the invention comprise at least one of the below-described constituents curable with actinic radiation and/or of the dual-cure constituents.

Where thermally externally crosslinking binders (A) are used, the thermally curable coating materials of the invention further comprise at least one of the thermally curable constituents described below, and the dual-cure coating materials of the invention comprise at least one of the thermally curable constituents described below and at least one of the constituents described below that is curable with actinic radiation, and/or at least one of the dual-cure constituents described below.

Where binders (A) curable with actinic radiation are used, the dual-cure coating materials of the invention further comprise at least one of the thermally curable constituents described below and/or at least one of the dual-cure constituents described below.

Examples of suitable addition (co)polymers (A) are (meth)acrylate (co)polymers or partially saponified polyvinyl esters, especially (meth)acrylate copolymers.

Examples of suitable polyaddition resins and/or polycondensation resins (A) are polyesters, alkyds, polyurethanes, polylactones, polycarbonates, polyethers, epoxy resin-amine adducts, polyureas, polyamides, polyimides, polyester-polyurethanes, polyether-polyurethanes or polyester-polyether-polyurethanes, especially polyesters.

Of these binders (A), the (meth)acrylate copolymers and the polyesters, especially the (meth)acrylate copolymers, have particular advantages and are therefore used with particular preference.

The coating material for use in accordance with the invention accordingly comprises at least one, especially one, (meth)acrylate copolymer (A) as binder. In some cases, however, it may be advantageous to use at least two, especially two, (meth)acrylate copolymers (A) which have a different profile of properties in terms of the preferred ranges of OH number, glass transition temperature, and number-average and mass-average molecular weight that are indicated below.

The (meth)acrylate copolymer (A) preferably has
  an OH number of from 100 to 220, more preferably from 130 to 200, with particular preference from 140 to 190, and in particular from 145 to 180 mg KOH/g,
  a glass transition temperature of from −35 to +60° C., in particular from −20 to +40° C.,
  a number-average molecular weight of from 1 000 to 10 000 daltons, in particular from 1 500 to 5 000 daltons, and
  a mass-average molecular weight of from 2 000 to 40 000 daltons, in particular from 3 000 to 20 000 daltons.

The (meth)acrylate copolymer (A) preferably contains an amount corresponding to its OH number of hydroxyl-containing olefinically unsaturated monomers (a) in copolymerized form, of which (a1) from 20 to 90%, preferably from 22 to 85%, more preferably from 25 to 80%, and in particular from 28 to 75% by weight, based in each case on the hydroxyl-containing monomers (a), are selected from the group consisting of 4-hydroxybutyl (meth)acrylate and 2-alkylpropane-1,3-diol mono(meth)acrylates, and (a2) from 20 to 80%, preferably from 15 to 78%, more preferably from 20 to 75%, and in particular from 25 to 72% by weight, based in each case on the hydroxyl-containing monomers (a), are selected from the group consisting of other hydroxyl-containing olefinically unsaturated monomers.

Examples of suitable 2-alkylpropane-1,3-diol mono(meth)acrylates (a1) are 2-methyl-, 2-ethyl-, 2-propyl-, 2-isopropyl- or 2-n-butylpropane-1,3-diol mono(meth)acrylate, of which 2-methylpropane-1,3-diol mono(meth)acrylate is particularly advantageous and is used with preference.

Examples of suitable other hydroxyl-containing olefinically unsaturated monomers (a2) are hydroxyalkyl esters of olefinically unsaturated carboxylic, sulfonic and phosphonic acids and acidic phosphoric and sulfuric esters, especially carboxylic acids, such as acrylic acid, beta-carboxyethyl acrylate, methacrylic acid, ethacrylic acid and crotonic acid, particularly acrylic acid and methacrylic acid. They are derived from an alkylene glycol, which is esterified with the acid, or are obtainable by reacting the acid with an alkylene oxide such as ethylene oxide or propylene oxide. It is preferred to use the hydroxyalkyl esters in which the hydroxyalkyl group contains up to 20 carbon atoms, particularly 2-hydroxyethyl or 3-hydroxypropyl acrylate or methacrylate; 1,4-bis(hydroxymethyl)cyclohexane or octahydro-4,7-methano-1H-indenedimethanol monoacrylate or monomethacrylate; or reaction products of cyclic esters, such as epsilon-caprolactone, for example, and these hydroxyalkyl esters; or olefinically unsaturated alcohols such as allyl alcohol; or polyols, such as trimethylolpropane monoallyl or diallyl ether or pentaerythritol monoallyl, diallyl or triallyl ether. These monomers (a2) of relatively high functionality are generally used only in minor amounts. In the context of the present invention, minor amounts of monomers (a2) of relatively high functionality are amounts which do not lead to crosslinking or gelling of the (meth)acrylate copolymers (A), unless the intention is that they should be in the form of crosslinked microgel particles.

Also suitable as monomers (a2) are ethoxylated and/or propoxylated allyl alcohol, which is sold by Arco Chemicals, or 2-hydroxyalkyl allyl ethers, especially 2-hydroxyethyl allyl ether. Where used, they are preferably employed not as sole monomers (a2) but in an amount of from 0.1 to 10% by weight, based on the (meth)acrylate copolymer (A).

Also suitable are reaction products of the olefinically unsaturated acids listed above, especially acrylic acid and/or methacrylic acid, with the glycidyl ester of an alpha-branched monocarboxylic acid having from 5 to 18 carbon atoms per molecule, in particular a Versatic® acid, or, instead of the reaction products, an equivalent amount of the abovementioned olefinically unsaturated acids, especially acrylic acid and/or methacrylic acid, which is then reacted, during or after the polymerization reaction, with the glycidyl ester of an alpha-branched monocarboxylic acid having from 5 to 18 carbon atoms per molecule, in particular a Versatic® acid (cf. Römpp Lexikon Lacke und Druckfarben, Georg Thieme Verlag, Stuttgart, New York, 1998, "Versatic® acids", pages 605 and 606).

Not least, acryloyloxysilane-containing vinyl monomers are suitable as monomers (a2), being preparable by reacting hydroxy-functional silanes with epichlorohydrin and then reacting that reaction product with (meth)acrylic acid and/or with hydroxyalkyl and/or hydroxycycloalkyl esters of (meth)acrylic acid and/or other hydroxyl-containing monomers (a1) and (a2).

Besides the hydroxyl groups, the (meth)acrylate copolymers (A) which are curable thermally and/or with actinic radiation may contain on average per molecule (i) at least one, in particular at least two, reactive functional group(s) which are able to undergo thermally initiated crosslinking reactions with complementary reactive functional groups, and/or (ii) at least one, in particular at least two, reactive functional group(s) having at least one, especially one, bond which can be activated with actinic radiation.

Examples of suitable complementary reactive functional groups (i) for use in accordance with the invention are compiled in the following overview. In the overview, the variable R stands for an acyclic or cyclic aliphatic radical, an aromatic radical and/or aromatic-aliphatic (araliphatic) radical; the variables R' and R" stand for identical or different aliphatic radicals or are linked with one another to form an aliphatic or heteroaliphatic ring.

Overview: Examples of Complementary Functional Groups (i) for Thermal Crosslinking

| Binder and or Crosslinking agent and binder | crosslinking agent |
|---|---|
| —SH | —C(O)—OH |
| —NH$_2$ | —C(O)—O—C(O)— |
| —O—(CO)—NH—(CO)—NH$_2$ | —NCO |
| —O—(CO)—NH$_2$ | —NH—C(O)—OR |
| >NH | —CH$_2$—OH |
| | —CH$_2$—O—R |
| | —NH—CH$_2$—O—R |
| | —NH—CH$_2$—OH |
| | —N(—CH$_2$—O—R)$_2$ |
| | —NH—C(O)—CH(—C(O)OR)$_2$ |
| | —NH—C(O)—CH(—C(O)OR)(—C(O)—R) |
| | —NH—C(O)—NR'R" |
| | >Si(OR)$_2$ |
| | 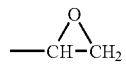 |
| | 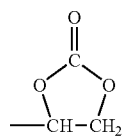 |
| —C(O)—OH | 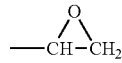 |
| | —C(O)—N(CH$_2$—CH$_2$—OH)$_2$ |

The selection of the respective complementary reactive functional groups (i) is guided on the one hand by the consideration that during the preparation of the binders (A) and during the preparation, the storage, the application, and the curing process they should not enter into any unwanted reactions, in particular no premature crosslinking, and/or should not disrupt or inhibit the actinic radiation cure, and secondly by the temperature range within which crosslinking is to take place.

Preferably, the complementary reactive functional groups (i) are selected on the one hand from the group consisting of hydroxyl, thiol, amino, N-methylolamino, N-alkoxymethylamino, imino, carbamate, allophanate and/or carboxyl groups, and on the other hand from the group consisting of anhydride, carboxyl, epoxy, blocked and unblocked isocyanate, urethane, alkoxycarbonylamino, methylol, methylol ether, carbonate, amino and/or beta-hydroxyalkylamide groups.

Self-crosslinking binders (A) contain, in particular, methylol, methylol ether and/or N-alkoxymethylamino groups (i).

The complementary reactive functional groups (i) may be introduced into the (meth)acrylate copolymers with the aid of the olefinically unsaturated monomers (a3) described below, which contain the reactive functional groups (i) in question, or by means of polymer-analogous reactions.

Examples of suitable olefinically unsaturated monomers (a3) are (a31) monomers which carry per molecule at least one amino group, such as aminoethyl acrylate, aminoethyl methacrylate, allylamine or N-methyliminoethyl acrylate; and/or (a32) monomers which carry per molecule at least one acid group, such as acrylic acid, beta-carboxyethyl acrylate, methacrylic acid, ethacrylic acid, crotonic acid, malic acid, fumaric acid or itaconic acid;

olefinically unsaturated sulfonic or phosphonic acids or their partial esters;

mono(meth)acryloyloxyethyl maleate, succinate or phthalate; or vinylbenzoic acid (all isomers), alpha-methylvinylbenzoic acid (all isomers) or vinylbenzenesulfonic acid (all isomers).

(a33) Monomers containing epoxide groups, such as the glycidyl ester of acrylic acid, methacrylic acid, ethacrylic acid, crotonic acid, malic acid, fumaric acid or itaconic acid, or allyl glycidyl ether.

One example of introducing reactive functional groups (i) by way of polymer-analogous reactions is the reaction of some of the hydroxyl groups present in the binder (A) with phosgene, to give resins containing chloroformate groups, and the polymer-analogous reaction of the chloroformate-functional resins with ammonia and/or primary and/or secondary amines to give binders (A) containing carbamate groups. Further examples of suitable methods of this kind are known from the patents U.S. Pat. Nos. 4,758,632 A1, 4,301,257 A1 and 2,979,514 A1. It is possible, moreover, to introduce carboxyl groups by the polymer-analogous reaction of some of the hydroxyl groups with carboxylic anhydrides, such as malic anhydride or phthalic anhydride.

Furthermore, the (meth)acrylate copolymers (A) may also contain at least one olefinically unsaturated monomer (a4) which is substantially or entirely free from reactive functional groups, such as:

Monomers (a41):

Substantially acid-group-free (meth)acrylic esters such as (meth)acrylic acid alkyl or cycloalkyl esters having up to 20 carbon atoms in the alkyl radical, especially methyl, ethyl, n-propyl, n-butyl, sec-butyl, tert-butyl, hexyl, ethylhexyl, stearyl and lauryl acrylate, or lauryl methacrylate; cycloaliphatic (meth)acrylic esters, especially cyclohexyl, isobornyl, dicyclopentadienyl, octahydro-4,7-methano-1H-indenemethanol or tert-butylcyclohexyl (meth)acryl ate; (meth) acrylic acid oxaalkyl esters or oxacycloalkyl esters such as ethoxytriglycol (meth)acrylate and methoxyoligoglycol (meth)acrylate having a molecular weight Mn of preferably 550 or other ethoxylated and/or propoxylated, hydroxyl-free (meth)acrylic acid derivatives (further examples of suitable monomers (31) of this kind are known from the laid-open specification DE 196 25 773 A1, column 3 line 65 to column 4 line 20). They may contain minor amounts of (meth)acrylic acid alkyl or cycloalkyl esters of higher functionality, such as ethylene glycol, propylene glycol, diethylene glycol, dipropylene glycol, butylene glycol, pentane-1,5-diol, hexane-1,6-diol, octahydro-4,7-methano-1H-indenedimethanol or cyclohexane-1,2-, -1,3- or -1,4-diol di(meth)acrylate; trimethylolpropane di- or tri(meth)acrylate; or pentaerythritol di-, tri- or tetra(meth)acrylate. In the context of the present invention, minor amounts of monomers (a41) of higher functionality are amounts which do not lead to crosslinking or gelling of the copolymers, except where the intention is that they should be in the form of crosslinked microgel particles.

Monomers (a42):

Vinyl esters of alpha-branched monocarboxylic acids having from 5 to 18 carbon atoms in the molecule. The branched monocarboxylic acids may be obtained by reacting formic acid or carbon monoxide and water with olefins in the presence of a liquid, strongly acidic catalyst; the olefins may be cracking products of paraffinic hydrocarbons, such as mineral oil fractions, and may include both branched and straight-chain acyclic and/or cycloaliphatic olefins. The reaction of such olefins with formic acid or with carbon monoxide and water produces a mixture of carboxylic acids in which the carboxyl groups are located predominantly on a quaternary carbon atom. Other olefinic starting materials are propylene trimer, propylene tetramer, and diisobutylene, for example. The vinyl esters may, however, also be prepared conventionally from the acids, for example, by reacting the acid with acetylene. Particular preference—owing to their ready availability—is given to using vinyl esters of saturated aliphatic monocarboxylic acids having from 9 to 11 carbon atoms and being branched on the alpha carbon atom. Vinyl esters of this kind are sold under the brand name VeoVa® (cf. also Römpp Lexikon Lacke und Druckfarben, Georg Thieme Verlag, Stuttgart, New York, 1998, page 598).

Monomers (a43):

Diarylethylenes, especially those of the general formula I:

$$R^3R^4C=CR^5R^6 \qquad (I),$$

in which the radicals $R^3$, $R^4$, $R^5$ and $R^6$, in each case independently of one another, stand for hydrogen atoms or substituted or unsubstituted alkyl, cycloalkyl, alkylcycloalkyl, cycloalkylalkyl, aryl, alkylaryl, cycloalkylaryl, arylalkyl or arylcycloalkyl radicals, with the proviso that at least two of the variables $R^3$, $R^4$, $R^5$ and $R^6$ stand for substituted or unsubstituted aryl, arylalkyl or arylcycloalkyl radicals, especially substituted or unsubstituted aryl radicals. Examples of suitable alkyl radicals are methyl, ethyl, propyl, isopropyl, n-butyl, isobutyl, tert-butyl, amyl, hexyl and 2-ethylhexyl. Examples of suitable cycloalkyl radicals are cyclobutyl, cyclopentyl and cyclohexyl. Examples of suitable alkylcycloalkyl radicals are methylenecyclohexane, ethylenecyclohexane, and propane-1,3-diylcyclohexane. Examples of suitable cycloalkylalkyl radicals are 2-, 3- or 4-methyl-, -ethyl-, -propyl- and -butylcyclohex-1-yl. Examples of suitable aryl radicals are phenyl, naphthyl, and biphenylyl, preferably phenyl and naphthyl, and especially phenyl. Examples of suitable alkylaryl radicals are benzyl and ethylene- or propane-1,3-diylbenzene. Examples of suitable cycloalkylaryl radicals are 2-, 3-, and 4-phenylcyclohex-1-yl. Examples of suitable arylalkyl radicals are 2-, 3- and 4-methyl-, -ethyl-, -propyl-, and -butylphen-1-yl. Examples of suitable arylcycloalkyl radicals are 2-, 3-, and 4-cyclohexylphen-1-yl. The aryl radicals $R^3$, $R^4$, $R^5$ and/or $R^6$ are preferably phenyl or naphthyl radicals, especially phenyl radicals. The substituents that may be present in the radicals $R^3$, $R^4$, $R^5$ and/or $R^6$ are electron-withdrawing or electron-donating atoms or organic radicals, especially halogen atoms, nitrile, nitro, partially or fully halogenated alkyl, cycloalkyl, alkylcycloalkyl, cycloalkylalkyl, aryl, alkylaryl, cycloalkylaryl, arylalkyl, and arylcycloalkyl radicals; aryloxy, alkyloxy and cycloalkyloxy radicals; and/or arylthio, alkylthio and cycloalkylthio radicals. Particularly advantageous are diphenylethylene, dinaphthaleneethylene, cis- or trans-stilbene or vinylidene-bis(4-nitrobenzene), especially diphenylethylene (DPE), and so are used with preference. In the context of the present invention the monomers (a43) are used in order to regulate the copolymerization advantageously in such a way that free-radical copolymerization in batch mode is also possible.

Monomers (a44):

Vinylaromatic hydrocarbons such as styrene, vinyltoluene, diphenylethylene or alpha-alkylstyrenes, especially alpha-methylstyrene.

Monomers (a45):

Nitriles such as acrylonitrile and/or methacrylonitrile.

Monomers (a46):

Vinyl compounds, especially vinyl and/or vinylidene dihalides such as vinyl chloride, vinyl fluoride, vinylidene dichloride or vinylidene difluoride; N-vinylamides such as vinyl-N-methylformamide, N-vinylcaprolactam or N-vinylpyrrolidone; 1-vinylimidazole; vinyl ethers such as ethyl vinyl ether, n-propyl vinyl ether, isopropyl vinyl ether, n-butyl vinyl ether, isobutyl vinyl ether and/or vinylcyclohexyl ether; and/or vinyl esters such as vinyl acetate, vinyl propionate, vinyl butyrate, vinyl pivalate and/or the vinyl ester of 2-methyl-2-ethylheptanoic acid.

Monomers (a47):

Allyl compounds, especially allyl ethers and allyl esters such as allyl methyl, ethyl, propyl or butyl ether or allyl acetate, propionate or butyrate.

Monomers (a48):

Polysiloxane macromonomers which have a number-average molecular weight Mn of from 1 000 to 40 000 and contain on average from 0.5 to 2.5 ethylenically unsaturated double bonds per molecule; especially polysiloxane macromonomers which have a number-average molecular weight Mn of from 2 000 to 20 000, with particular preference from 2 500 to 10 000, and in particular from 3 000 to 7 000, and contain on average per molecule from 0.5 to 2.5, preferably from 0.5 to 1.5, ethylenically unsaturated double bonds, as are described in DE 38 07 571 A1 on pages 5 to 7, in DE 37 06 095 A1 in columns 3 to 7, in EP 0 358 153 B1 on pages 3 to 6, in U.S. Pat. No. 4,754,014 A1 in columns 5 to 9, in DE 44 21 823 A1 or in the international patent application WO 92/22615 on page 12 line 18 to page 18 line 10.

The monomers (a1) and (a2) and also (a3) and/or (a4) are selected so as to give the OH numbers and glass transition temperatures indicated above. Furthermore, the monomers (a3) containing reactive functional groups (i) are selected in their nature and amount such that they do not inhibit, or prevent entirely, the crosslinking reactions of the hydroxyl groups with the compounds (C) described below.

For adjusting the glass transition temperatures, the skilled worker may select the monomers (a) with the assistance of the following formula of Fox, with which the glass transition temperatures of poly(meth)acrylates may be calculated approximately:

$$1/Tg = \sum_{n=1}^{n=x} Wn/Tg_n; \quad \sum_n W_n = 1$$

Tg=glass transition temperature of the poly(meth)acrylate;
$W_n$=weight fraction of the nth monomer;
$Tg_n$=glass transition temperature of the homopolymer of the nth monomer; and
x=number of different monomers.

The preparation of the (meth)acrylate copolymers (A) preferred for use has no special features in terms of its process technology but instead takes place with the aid of the methods of continuous or batchwise, free-radically initiated copolymerization that are customary and known in the plastics field, in bulk, solution, emulsion, miniemulsion or microemulsion, under atmospheric pressure or superatmospheric pressure, in stirred tanks, autoclaves, tube reactors, loop reactors or Taylor reactors, at temperatures of preferably from 50 to 200° C.

Examples of suitable copolymerization processes are described in the patent applications DE 197 09 465 A1, DE 197 09 476 A1, DE 28 48 906 A1, DE 195 24 182 A1, DE 198 28 742 A1, DE 196 28 143 A1, DE 196 28 142 A1, EP 0 554 783 A1, WO 95/27742, WO 82/02387 and WO 98/02466. Alternatively, the copolymerization may be conducted in polyols (thermally curable reactive diluents) as the reaction medium, as is described, for example, in the German patent application DE 198 50 243 A1.

Examples of suitable free-radical initiators are dialkyl peroxides, such as di-tert-butyl peroxide or dicumyl peroxide; hydroperoxides, such as cumene hydroperoxide or tert-butyl hydroperoxide; peresters, such as tert-butyl perbenzoate, tert-butyl perpivalate, tert-butyl per-3,5,5-trimethylhexanoate or tert-butyl per-2-ethylhexanoate; peroxodicarbonates; potassium, sodium or ammonium peroxodisulfate; azo initiators, examples being azo dinitriles such as azobisiso-butyronitrile; C—C-cleaving initiators such as benzpinacol silyl ethers; or a combination of a nonoxidizing initiator with hydrogen peroxide. Combinations of the above-described initiators may also be used.

Further examples of suitable initiators are described in the German patent application DE 196 28 142 A1, page 3 line 49 to page 4 line 6.

It is preferred to add comparatively large amounts of free-radical initiator, with the fraction of the initiator in the reaction mixture, based in each case on the overall amount of the monomers (a) and of the initiator, being with particular preference from 0.2 to 20% by weight, with very particular preference from 0.5 to 15% by weight, and in particular from 1.0 to 10% by weight.

It is also possible to use thiocarbonylthio compounds or mercaptans such as dodecyl mercaptan as chain transfer agents or molecular weight regulators.

The nature and amount of the (meth)acrylate copolymers (A) are preferably selected in such a way that, following their curing, the coating materials of the invention have a storage modulus E' in the rubber-elastic range of at least $10^{7.5}$ Pa and a loss factor tan$\delta$ at 20° C. of not more than 0.10, the storage modulus E' and the loss factor having been measured by dynamic mechanical thermoanalysis on free films with a thickness of 40±10 µm (cf. in this respect the German patent DE 197 09 467 C2).

Reactive functional groups (ii) having at least one bond which can be activated with actinic radiation may be present in the binders (A). Examples of suitable groups (ii) are the reactive functional groups S described above in connection with the general formula I. Where the dual-cure coating materials of the invention include, apart from the nanoparticles (B), no other constituents which can be cured with actinic radiation, the (meth)acrylate copolymers (A) mandatorily contain these groups S.

The dual-cure binder (A) contains on average at least one of the groups S. This means that the functionality of the binder (A) in this respect is integral, i.e., for example, is equal to two, three, four, five or more, or is nonintegral, i.e., is equal for example to from 2.1 to 10.5 or more.

Where on average per molecule more than one group S is employed, the groups S are structurally different from one another or of the same structure.

Where they are structurally different from one another, this means in the context of the present invention that two, three, four or more, but especially two, groups S which can be activated with actinic radiation are used which derive from two, three, four or more, but especially two, monomer classes.

The groups S are attached to the respective parent structures of the binders (A) preferably by way of urethane, urea, allophanate, ester, ether and/or amide groups, but in particular by way of ester groups. Normally this is effected by customary and known polymer-analogous reactions such as, for instance, the reaction of pendant glycidyl groups with the above-described olefinic unsaturated monomers containing an acid group, of pendent hydroxyl groups with the halides of these monomers, of hydroxyl groups with isocyanates containing double bonds, such as vinyl isocyanate, methacryloyl isocyanate and/or 1-(1-isocyanato-1-methylethyl)-3-(1-methylethenyl)benzene (TMI® from CYTEC), or of isocyanate groups with the above-described hydroxyl-containing monomers (a1) and/or (a2).

The amount of the binders (A) in the coating materials of the invention may vary widely and is guided primarily by the functionality of the binders (A), on the one hand, and of the compounds (C), present if desired and described below, on the other. The amount, based on the solids of the coating material of the invention, is preferably from 20 to 99.8%, more preferably from 25 to 95%, with particular preference from 30 to 90%, with very particular preference from 35 to 85%, and in particular from 40 to 80% by weight.

Depending on whether the binders (A) are curable physically, thermally, with actinic radiation, or thermally and with actinic radiation, the coating materials of the invention mandatorily include at least one constituent selected from the group consisting of low molecular mass, oligomeric and polymeric compounds (C) which are different than the (meth) acrylate copolymers (A) and which contain on average per molecule (i) at least one, preferably at least two, of the above-described reactive functional groups which are able to undergo thermally initiated cross-linking reactions with complementary reactive functional groups, especially hydroxyl groups, and/or (ii) at least one, preferably at least two, of the above-described reactive functional groups having at least one bond which can be activated with actinic radiation, i.e., at least one group S, or the coating materials of the invention may comprise compounds (C). The skilled worker can determine the suitable combinations of constituents easily using the rules given for the binders (A).

Suitable low molecular mass and non-(A) polymeric and oligomeric compounds (C) which have reactive functional groups (i) for thermal crosslinking are customary and known crosslinking agents, such as are known, for example, from the German patent application DE 199 24 171 A1, page 7 line 38 to page 8 line 46 in conjunction with page 3 line 43 to page 5 line 31. Preference is given to employing blocked, part-blocked or nonblocked polyisocyanates.

Examples of suitable low molecular mass, oligomeric and/or polymeric compounds (C) containing at least one group S are described in detail in Römpp Lexikon Lacke und Druckfarben, Georg Thieme Verlag, Stuttgart, New York, 1998, "reactive diluents", pages 491 and 492, in the German patent application DE 199 08 013 A1, column 6 line 63 to column 8 line 65, in the German patent application DE 199 08 018 A1, page 11 lines 31 to 33, in the German patent application DE 198 18 735 A1, column 7 lines 1 to 35, or in the German patent DE 197 09 467 C1, page 4 line 36 to page 5 line 56. Preference is given to using pentaerythritol tetraacrylate and/or aliphatic urethane acrylates containing six acrylate groups in the molecule.

Instead of or in addition to the compounds (C) described above, the coating materials of the invention may contain at least one, in particular at least two, low molecular mass, oligomeric and/or polymeric compound(s) (C) containing at least one, especially at least two, group(s) (i) and at least one, in particular at least two, group(s) S. Examples of suitable compounds (C) of this kind are described in detail in the European patent application EP 0 928 800 A1, page 3 lines 17 to 54 and page 4 lines 41 to 54, or in the German patent application DE 198 18 735 A1, column 3 line 16 to column 6 line 33. It is preferred to use dipentaerythritol pentaacrylate or isocyanato acrylates, which are preparable from polyisocyanates and the above-described hydroxyl-containing monomers (a1) and/or (a2).

The coating materials of the invention preferably comprise at least one photoinitiator, preferably at least two and in particular three photoinitiators (D), in an amount of from 0.2 to 5%, preferably from 0.3 to 4.8%, more preferably from 0.4 to 4.6%, with particular preference from 0.5 to 4.5%, and in particular from 0.5 to 4.3% by weight, based in each case on the solids of the coating material of the invention.

Examples of suitable photoinitiators (D) are described in Römpp Lexikon Lacke und Druckfarben, Georg Thieme Verlag, Stuttgart, New York, 1998, pages 444 to 446.

Photoinitiators (D) are commercially customary compounds and are sold, for example, by BASF Aktiengesellschaft under the brand name LUCIRIN®, by Ciba Specialty Chemicals under the brand name IRGACURE®, and by Rahn under the brand name GENOCURE®.

Furthermore, the coating materials of the invention may comprise at least one additive (E) selected from the group consisting of thermally curable reactive diluents; molecularly dispersely soluble dyes; light stabilizers, such as UV absorbers and reversible free-radical scavengers (HALS); antioxidants; low-boiling and high-boiling ("long") organic solvents; devolatilizers; wetting agents; emulsifiers; slip additives; polymerization inhibitors; thermal crosslinking catalysts; thermolabile free-radical initiators; adhesion promoters; leveling agents; film formation auxiliaries; Theological aids, such as thickeners and pseudoplastic sag control agents, SCAs; flame retardants; corrosion inhibitors; free-flow aids; waxes; siccatives; biocides, and flatting agents.

Examples of suitable additives (E) are described in detail in the textbook "Lackadditive" [Additives for coatings] by Johan Bieleman, Wiley-VCH, Weinheim, New York, 1998, in D. Stoye and W. Freitag (editors), "Paints, Coatings and Solvents", second, completely revised edition, Wiley-VCH, Weinheim, New York, 1998, "14.9. solvent groups", pages 327 to 373, in the German patent application DE 199 14 896 A1, column 14 line 26 to column 15 line 46, or in the German patent application DE 199 08 018 A1, page 9 line 31 to page 8 line 30. For further details, refer to the German patent applications DE 199 04 317 A1 and DE 198 55 125 A1.

The coating materials of the invention that comprise the above-described constituents (A) and (B) and also, where appropriate, (C), (D) and/or (E) are used, in particular, as clearcoat materials of the invention for producing clearcoats.

The pigmented coating materials of the invention further comprise at least one pigment (F) selected from the group consisting of organic and inorganic, transparent and hiding, color and/or effect, electrically conductive, magnetically shielding, and fluorescent pigments, fillers, and non-(B) nanoparticles.

The pigmented coating materials of the invention are employed in particular as primer-surfacers, basecoat materials and solid-color topcoat materials of the invention for producing primer-surfacer coats or antistonechip primer coats, basecoats, and solid-color topcoats of the invention.

Where exclusively nonhiding, transparent pigments (F), especially nanoparticles (F), are used, the pigmented coating materials of the invention may also be used as clearcoat materials.

In terms of its method, the preparation of the coating materials of the invention has no special features but instead takes place by the mixing and homogenizing of the above-described constituents using customary and known mixing techniques and equipment such as stirred vessels, stirred mills, extruders, kneaders, Ultraturrax, in-line dissolvers, static mixers, toothed-ring dispersers, pressure release nozzles and/or microfluidizers, preferably in the absence of actinic radiation.

The resulting coating materials of the invention may be conventional coating materials, containing organic solvents, aqueous coating materials, substantially or fully solvent-free and water-free liquid coating materials (100% systems), substantially or fully solvent-free and water-free solid coating materials (powder coating materials), or substantially or fully solvent-free powder coating suspensions (powder slurries). Moreover, they may be one-component systems, in which the binders (A) and the crosslinking agents (C) are present alongside one another, or two-component or multicomponent systems, in which the binders (A) and the crosslinking agents (C) are present separately from one another until shortly before application.

In terms of its method, the application of the dual-cure coating materials for use in the process of the invention has no special features but may instead take place by any customary and known application method suitable for the coating material in question, such as electrodeposition coating, spraying, knife coating, brushing, flow coating, dipping, trickling or rolling, for example. Preference is given to employing spray application methods, such as compressed air spraying, airless spraying, high-speed rotation, electrostatic spray application (ESTA), alone or in conjunction with hot spray application such as hot air spraying, for example, except where the coating materials in question are powder coating materials.

The application of the powder coating materials also has no special features in terms of its method but instead takes place, for example, by the customary and known fluidized bed techniques, such as are known, for example, from the BASF Coatings AG company brochures "Pulverlacke für industrielle Anwendungen" [powder coating materials for industrial applications], January 2000, or "Coatings Partner, Pulverlack Spezial" [Coatings Partner, powder coatings special], January 2000, or Römpp Lexikon Lacke und Druckfarben, Georg Thieme Verlag, Stuttgart, New York, 1998, pages 187 and 188, "electrostatic powder spraying", "electrostatic spraying", and "electrostatic fluidized bath process".

In the course of application of the dual-cure coating materials of the invention it is advisable to operate in the absence of actinic radiation in order to prevent their premature crosslinking.

The curing of the coating materials of the invention generally takes place after a certain rest period or flash-off time. This may have a duration of 5 s to 2 h, preferably from 1 min to 1 h, and in particular from 1 min to 45 min. The rest period is used, for example, for leveling and devolatilization of the coating films and for the evaporation of volatile constituents such as any solvent and/or water present. Flashing off may be accelerated by an increased temperature, but one less than that sufficient for curing, and/or by a reduced atmospheric humidity.

In the context of wet-on-wet techniques, this process measure also may be employed for the drying of applied coating films, particularly electrocoat, primer-surfacer and/or basecoat films, which are not to be cured or are to be only part-cured.

The thermal cure takes place, for example, with the aid of a gaseous, liquid and/or solid hot medium, such as hot air, heated oil or heated rollers, or of microwave radiation, infrared light and/or near infrared (NIR) light. Heating preferably takes place in a forced air oven or by exposure to IR and/or NIR lamps. As in the case of the actinic radiation cure, the thermal cure may also take place in stages. Advantageously, the thermal cure takes place at temperatures from room temperature up to 200° C.

In the actinic radiation (especially UV radiation) cure it is preferred to employ a dose of from 500 to 4 000, more preferably from 1 000 to 2 900, with particular preference from 1 200 to 2 800, with very particular preference from 1 300 to 2 700, and in particular from 1 400 to 2 600 mJ/cm$^2$.

The actinic radiation cure is carried out using the customary and known radiation sources and optical auxiliary measures. Examples of suitable radiation sources are flash lamps from the company VISIT, high-pressure or low-pressure mercury vapor lamps, with or without lead doping, in order to open up a radiation window of up to 405 nm, or electron beam sources. Their arrangement is known in principle and may be adapted to the circumstances of the workpiece and the process parameters. In the case of workpieces of complex shape, such as those envisaged for automobile bodies, those areas which are not accessible to direct radiation (shadow areas), such as cavities, folds and other structural undercuts, may be cured using pointwise, small-area or all-round emitters, in conjunction with an automatic movement means for the irradiation of cavities or edges.

The equipment and conditions for these curing methods are described, for example, in R. Holmes, U.V. and E.B. Curing Formulations for Printing Inks, Coatings and Paints, SITA Technology, Academic Press, London, United Kingdom 1984, or in the German patent application DE 198 18 735 A1, column 10 line 31 to column 11 line 16.

Curing here may take place in stages, i.e., by multiple exposure to light or actinic radiation. It may also be carried out alternatingly, i.e., by curing alternately with UV radiation and electron beams, for example.

The thermal cure and actinic radiation cure (dual cure) may be employed simultaneously or in succession. Where the two methods of curing are employed in succession, it is possible, for example, to commence with the thermal cure and to end with the actinic radiation cure. In other cases it may prove advantageous to begin and to end with the actinic radiation cure.

Preferably, curing with actinic radiation is carried out under inert gas to prevent ozone formation. Instead of a straight inert gas, an oxygen-depleted atmosphere may be used.

"Oxygen-depleted" means that the oxygen content of the atmosphere is less than the oxygen content of air (20.95% by volume). The maximum content in the oxygen-depleted atmosphere is preferably 18%, more preferably 16%, with particular preference 14%, with very particular preference 10%, and in particular 6.0% by volume. The minimum oxygen content is preferably 0.1%, more preferably 0.5%, with particular preference 1.0%, with very particular preference 1.5%, and in particular 2.0% by volume.

The oxygen-depleted atmosphere may be provided in a variety of ways. For example, an appropriate gas mixture may be prepared and be made available in pressure bottles. The depletion is preferably achieved by introducing at least one inert gas in the requisite amounts into the air cushion located above the surface of the dual-cure films that are to be cured. The oxygen content of the atmosphere located above the surface in question may be measured continuously with the aid of customary and known methods and equipment for determining elemental oxygen and may, where appropriate, be adjusted automatically to the desired level.

By inert gas is meant a gas which under the curing conditions employed is not decomposed by the actinic radiation, does not inhibit curing, and/or does not react with the dual-cure coating material of the invention. Preference is given to using nitrogen, carbon dioxide, helium, neon or argon, especially nitrogen and/or carbon dioxide.

The above-described curing and application processes and apparatus may also be used for noninventive coating materials, such as electrocoat materials, primer-surfacers or basecoat materials, which are used together with the coating materials of the invention to produce multicoat clearcoat systems and multicoat color and/or effect paint systems.

Examples of suitable electrocoat materials and, where appropriate, of wet-on-wet techniques are described in the Japanese patent application 1975-142501 (Japanese laid-open specification JP 52-065534 A2, Chemical Abstracts report No. 87: 137427) or in the patents and patent applications U.S. Pat. Nos. 4,375,498 A1, 4,537,926 A1, 4,761,212 A1, EP 0 529 335 A1, DE 41 25 459 A1, EP 0 595 186 A1, EP 0 074 634A1, EP0 505 445 A1, DE 42 35 778 A1, EP 0 646 420 A1, EP 0 639 660 A1, EP 0 817 648 A1, DE 195 12 017 C1, EP 0 192 113 A2, DE 41 26 476 A1 and WO 98/07794.

Suitable primer-surfacers, especially aqueous primer-surfacers, which are also referred to as antistonechip primer coats or functional coats, are known from the patents and patent applications U.S. Pat. No. 4,537,926 A1, EP 0 529 335 A1, EP 0 595 186 A1, EP 0 639 660 A1, DE 44 38 504 A1, DE 43 37 961 A1, WO 89/10387, U.S. Pat. Nos. 4,450,200 A1, 4,614,683 A1 and WO 94/26827.

Suitable basecoat materials, especially aqueous basecoat materials, are known from the patent applications EP 0 089 497 A1, EP 0 256 540 A1, EP 0 260 447 A1, EP 0 297 576 A1, WO 96/12747, EP 0 523 610 A1, EP 0 228 003 A1, EP 0 397 806 A1, EP 0 574 417 A1, EP 0 531 510 A1, EP 0 581 211 A1, EP 0 708 788 A1, EP 0 593 454 A1, DE-A-43 28 092 A1, EP 0 299 148 A1, EP 0 394 737 A1, EP 0 590 484 A1, EP 0 234 362 A1, EP 0 234 361 A1, EP 0 543 817 A1, WO 95/14721, EP 0 521 928 A1, EP 0 522 420 A1, EP 0 522 419 A1, EP 0 649 865 A1, EP 0 536 712 A1, EP 0 596 460 A1, EP 0 596 461 A1, EP 0 584 818 A1, EP 0 669 356 A1, EP 0 634 431 A1, EP 0 678 536 A1, EP 0 354 261 A1, EP 0 424 705 A1, WO 97/49745, WO 97/49747, EP 0 401 565 A1 and EP 0 817 684, column 5 lines 31 to 45.

The film thicknesses of the inventive and noninventive coatings are preferably situated within the ranges that are commonly employed:

Electrocoat:
Preferably from 10 to 60, more preferably from 15 to 50, and in particular from 15 to 40, µm;

Primer-Surfacer Coat:
Preferably from 20 to 150, more preferably from 25 to 100, and in particular from 30 to 80, µm;

Basecoat:
Preferably from 5 to 30, more preferably from 7.5 to 25, and in particular from 10 to 20, µm;

Solid-Color Topcoat:
Preferably from 10 to 60, more preferably from 15 to 50, and in particular from 15 to 40, µm;

Clearcoat:
Preferably from 10 to 100, more preferably from 15 to 80, and in particular from 20 to 70, µm.

The coatings of the invention obtained, especially the single-coat or multicoat color and/or effect paint systems and clearcoats of the invention, are easy to produce and have outstanding optical properties. In particular, they are free from turbidities and inhomogeneities. They have very good reflow properties and outstanding scratch resistance.

A further advantage of the coating materials of the invention is that, even in the shadow zones of three-dimensional substrates of complex shape, such as vehicle bodies, radiators or electrical wound products, and even without optimum, in particular, complete exposure of the shadow zones to actinic radiation, they give coatings whose profile of performance properties at least approaches that of the coatings outside of the shadow zones. As a result, the coatings present within the shadow zones are also no longer easily damaged by mechanical and/or chemical attack, as may occur, for example, on the line during the installation of further motor vehicle components into the coated bodies.

In particular, however, the coatings of the invention produced from the coating materials of the invention are notable for outstanding overbake stability, yellowing stability, and resistance to moisture exposure. A point worthy of emphasis is their high surface hardness, which means that the coatings of the invention may be sanded, polished, and buffed without problems.

The coating materials of the invention may also, however, be used as adhesives and sealing compounds for producing adhesive films and seals of the invention and may serve for the coating, bonding and/or sealing of primed or unprimed substrates made of metal, plastic, glass, wood, textile, leather, natural stone and artificial stone, concrete, cement, or composites of these materials.

The coating materials, adhesives or sealing compounds of the invention may therefore be used to coat, bond and seal motor vehicle bodies and parts thereof, the interior and exterior of motor vehicles, buildings inside and out, doors, windows, furniture, and for coating, bonding and sealing in the context of the industrial finishing of small parts, coils, containers, packaging, electrical components, and white goods, all with great success.

The substrates may have been primed.

In the case of plastics, customary and known primer coats or tie coats may be employed or the surfaces of the plastic may have been given a firm-adhesion finish by flaming or etching with reactive compounds such as fluorine.

In the case of electrically conductive substrates, especially metals, the primers used may be those as described in Römpp Lexikon Lacke und Druckfarben, Georg Thieme Verlag, Stuttgart, New York, 1998, "primers", page 473, "wash primers", page 618, or "shop primers", page 230.

In the case of electrically conductive substrates based on aluminum, the primer coat used is preferably an aluminum oxide layer produced by anodic oxidation.

Owing to the outstanding performance properties of the coatings, adhesive films and seals of the invention, the substrates that are coated, bonded and/or sealed with them have a particularly long service life and so are particularly valuable for users from an economic, environmental, and technical standpoint.

EXAMPLES

Preparation Example 1

The Preparation of a Thermally Curable Binder

In an appropriate reactor equipped with a stirrer, two dropping funnels for the monomer mixture and the initiator solution, a nitrogen inlet pipe, thermometer, heating system, and reflux condenser, 650 parts by weight of an aromatic hydrocarbon fraction with a boiling range from 158 to 172° C. were weighed in. The solvent was heated to 140° C. Thereafter a monomer mixture of 652 parts by weight of ethylhexyl acrylate, 383 parts by weight of 2-hydroxyethyl methacrylate, 143 parts by weight of styrene, 212 parts by weight of 4-hydroxybutyl acrylate and 21 parts by weight of acrylic acid was metered into the initial charge at a uniform rate over the course of four hours and an initiator solution of 113 parts by weight of the aromatic solvent and 113 parts by weight of tert-butyl perethylhexanoate was metered into the initial charge at a uniform rate over the course of 4.5 hours. The addition of the monomer mixture and of the initiator solution was commenced simultaneously. After the end of the initiator feed, the resulting reaction mixture was heated at 140° C. for two hours more, with stirring, and was then cooled. The resulting solution of the methacrylate copolymer (A) was diluted with a mixture of 1-methoxypropyl 2-acetate, butyl glycol acetate and butyl acetate. The resulting solution had a solids content of 65% by weight, determined in a forced air oven (one hour/130° C.), and an acid number of 15 mg KOH/g solids.

Preparation Example 2

The Preparation of a Nanoparticle Paste (B) for Inventive Use

The nanoparticle paste (B) was prepared by mixing 1 050 parts by weight of the binder solution (A) from preparation example 1, 225 parts by weight of butyl acetate and 300 parts by weight of Aerosil® VP R 7200, predispersing the resulting mixture at 25 000 rpm in a laboratory dissolver for 5 minutes and grinding the predispersion in a bead mill (stirred laboratory mill from Vollrath with 2 mm beads) for 30 minutes to a gindometer value of 10 μm.

Example 1

The Preparation of an Inventive Clearcoat Material

The dual-cure clearcoat material was prepared by mixing the constituents indicated in the table and homogenizing the resulting mixture. The nanoparticle paste (B) was added to the stock varnish at the end.

TABLE

The material compositions of the dual-cure clearcoat material

| Constituent | Parts by weight |
|---|---|
| Stock varnish: | |
| Constituent (A): | |
| Methacrylate copolymer from preparation example 1 | 27.17 |
| Constituent (B): | |
| Nanoparticle paste from preparation example 2 | 13.1 |
| Constituent (C): | |
| Dipentaerythritol pentaacrylate | 20 |
| Constituent (D): | |
| Irgacure ® 184 (commercial photoinitiator from Ciba Specialty Chemicals) | 2.0 |
| Genocure ® MBF (commercial photoinitiator from Rahn) | 0.5 |
| Lucirin ® TPO (commercial photoinitiator from BASF AG) | |
| Constituent (E): | |
| UV absorber (substituted hydroxyphenyltriazine) | 1.0 |
| HALS (N-methyl-2,2,6,6-tetramethylpiperidinyl ester) | 1.0 |
| Byk ® 306 from Byk Chemie) | 0.4 |
| Butyl acetate | 23.05 |
| Solventnaphtha ® | 10.8 |
| Total: | 100 |

TABLE-continued

The material compositions of the dual-cure clearcoat material

| Constituent | Parts by weight |
|---|---|
| Crosslinking component (C): | |
| Crosslinking agent (C1): | |
| Isocyanato acrylate Roskydal ® UA VPLS 2337 from Bayer AG (basis: trimeric hexamethylene diisocyanate; isocyanate group content: 12% by weight) | 27.84 |
| Crosslinking agent (C2): | |
| Isocyanato acrylate based on the trimer of isophorone diisocyanate (70.5% in butyl acetate; viscosity: 1500 mPas; isocyanate group content: 6.7% by weight; prepared analogously to example 1 of EP 0 928 800 A1) | 6.96 |
| Diluent | 3.48 |
| Total: | 38.28 |

The dual-cure clearcoat material had an advantageously long pot life (processing time).

Example 2

The Production of a Black and of a White Inventive Multicoat Paint System

For example 2, the clearcoat material from example 1 was used.

To produce the black multicoat paint system, steel panels were coated in succession with an electrocoat, deposited cathodically and baked at 170° C. for 20 minutes, with a dry film thickness of from 18 to 22 μm. The steel panels were then coated with a commercially customary two-component waterborne primer-surfacer from BASF Coatings AG, as is commonly used for plastics substrates. The resulting primer-surfacer film was baked at 90° C. for 30 minutes so as to give a dry film thickness of from 35 to 40 μm. Thereafter a commercially customary black aqueous basecoat material from BASF Coatings AG was applied with a film thickness of from 12 to 15 μm, after which the resulting aqueous basecoat films were flashed off at 80° C. for ten minutes. The clearcoat material was then applied pneumatically using a gravity-feed cup gun in one cross pass, with a film thickness of from 40 to 45 μm. The aqueous basecoat films and the clearcoat films were cured at room temperature for 5 minutes, at 80° C. for 10 minutes, followed by exposure to UV light in a dose of 1 500 mJ/cm$^2$, and finally at 140° C. for 20 minutes.

The multicoat paint system had a very good profile of properties in terms of gloss, hardness, and scratch resistance.

It was very bright and had a gloss (20°) to DIN 67530 of 89.3. The micropenetration hardness (universal hardness at 25.6 mN, Fischerscope 100V with Vickers diamond pyramid) was 119.1.

The scratch resistance was assessed using the sand test (cf. the German patent application DE 198 39 453 A1, page 9 lines 1 to 63) on the basis of the metal test panels described above. The loss of gloss was 10.8 units (20 20 ). The reflow behavior was very good.

In the MB gradient oven test, which is known to those skilled in the art, initial damage to the inventive multicoat paint systems by sulfuric acid was evident only above a temperature of 51° C., that caused by tree resin only above 55° C., and that by deionized water only above 61° C. The etch resistance was also outstanding.

The multicoat paint system 2 showed very good leveling and a surface which was free from defects, without popping marks.

The intercoat adhesion was very good (cross-cut test in accordance with DIN EN ISO 2409: GT0-1), even after exposure to constant condensation conditions. To test the yellowing resistance and the overbake stability, a multicoat paint system was produced in the manner described above, using a white aqueous basecoat material.

The resulting multicoat paint system was measured by colorimetry. After baking it had a b value (cf. Römpp Lexikon Lacke und Druckfarben, Stuttgart, New York, 1988 "CIELAB distance formula", pages 114 and 115) of only 0.5.

If, during its production, the white multicoat paint system was overbaked at 155° C., at 170° C., and at 185° C., for 30 minutes in each case, the b value rose only to 2.1, 3.9, and 7.1, which underscored the high yellowing stability.

What is claimed is:

1. A coating material, curable thermally or thermally and with actinic radiation, comprising
   (A) at least one binder comprising a (meth)acrylate copolymer having a glass transition temperature of from −35° C. to +40° C., and
   (B) nanoparticles modified with at least one compound of general formula I:

$$[(S-)_o-L-]_n-M-(-X-R)_{m-n} \quad (I),$$

wherein
   S is a reactive functional group having at least one bond which can be activated with actinic radiation;
   L is at least one divalent organic linking group;
   X independently at each occurrence, is an oxygen atom, sulfur atom or >NR$^1$, where R$^1$=hydrogen atom or alkyl group having from 1 to 4 carbon atoms;
   M is a metal atom;
   R is a monovalent organic radical;
   o is an integer from 1 to 5;
   m is 3 or 4;
   n is 1 or 2 if m=3, and
   n is 1, 2 or 3 if m=4.

2. The coating material of claim 1, wherein the coating material has a nanoparticles content, based on the solids of the coating material, from 0.1 to 20% by weight.

3. The coating material of claim 1, wherein the bonds which can be activated with actinic radiation are selected from the group consisting of carbon-hydrogen single bonds, or carbon-carbon single bonds, carbon-oxygen single bonds, carbon-nitrogen single bonds, carbon-phosphorus single bonds, carbon-silicon single bonds, carbon-carbon double bonds, carbon-oxygen double bonds, carbon-nitrogen double bonds, carbon-phosphorus double bonds, carbon-silicon double bonds, and combinations thereof.

4. The coating material as claimed in claim 3, wherein the bonds that can be activated with actinic radiation are carbon-carbon double bonds.

5. The coating material as claimed in claim 4, wherein the reactive functional groups S are selected from the group consisting of (meth)acrylate groups, ethacrylate groups, crotonate groups, cinnamate groups, vinyl ether groups, vinyl ester groups, dicyclopentadienyl groups, norbornenyl groups, isoprenyl groups, isopropenyl groups, allyl groups, butenyl groups, dicyclopentadienyl ether groups, norbornenyl ether groups, isoprenyl ether groups, isopropenyl ether groups, allyl ether groups, butenyl ether groups, dicyclopentadienyl ester groups, norbornenyl ester groups, isoprenyl ester groups, isopropenyl ester groups, allyl ester groups, butenyl ester groups, and combinations thereof.

6. The coating material of claim 5, wherein the reactive functional groups S are methacrylate groups.

7. The coating material of claim 1, wherein X is an oxygen atom.

8. The coating material of claim 1, wherein M is silicon.

9. The coating material of claim 1, wherein the variable R is at least one member selected from the group consisting of methyl, ethyl, propyl, or n-butyl.

10. The coating material of claim 1, wherein variable L is at least one member selected from the group consisting of trimethylene, tetramethylene, pentamethylene, hexamethylene, heptamethylene, or octamethylene.

11. The coating material of claim 1, wherein n is 1 if m=3 or 4.

12. The coating material of claim 1, wherein the compound of general formula I is a methacryloyloxypropyltrimethoxysilane.

13. The coating material of claim 1, wherein the nanoparticles are selected from the group consisting of nanoparticles based on silica, alumina, zinc oxide, zirconium oxide, polyacids of transition metals, heteropolyacids of transition metals, and combinations thereof, each having a primary particle size <50 nm.

14. The coating material of claim 13, wherein the nanoparticles are silica-based nanoparticles.

15. The coating material of claim 14, wherein the silica-based nanoparticles are hydrophilic pyrogenic silica particles.

16. The coating material of claim 15, wherein the (meth)acrylate copolymer has an OH number of from 100 to 220 mg KOH/g, a number-average molecular weight of from 1 000 to 10 000 daltons and a mass-average molecular weight of from 2 000 to 40 000 daltons.

17. The coating material of claim 16, wherein the (meth)acrylate copolymer contains in copolymerized form an amount of hydroxyl-containing olefinically unsaturated monomers of which
   (a1) from 22 to 85% by weight, based on the hydroxyl-containing olefinically unsaturated monomers, are selected from the group consisting of 4-hydroxybutyl (meth)acrylate, 2-alkylpropane-1,3-diol mono(meth)acrylate, and combinations thereof,
   (a2) from 15 to 78% by weight, based on the hydroxyl-containing olefinically unsaturated monomers, are selected from the group consisting of other hydroxyl-containing olefinically unsaturated monomers.

18. The coating material of claim 17, wherein the 2-alkylpropane-1,3-diol mono (meth)acrylates are selected from the group consisting of 2-methylpropane-1,3-diol mono (meth) acrylate, 2-ethylpropane-1,3-diol mono (meth)acrylate, 2-propylpropane-1,3-diol mono (meth) acrylate, 2-isopropylpropane-1,3-diol mono (meth) acrylate, 2-n-butylpropane-1,3-diol mono(meth)acrylate, and combinations thereof.

19. The coating material of claim 18, wherein the 2-alkylpropane-1,3-diol mono (meth)acrylate is 2-methylpropane-1,3-diol mono (meth)acrylate.

20. The coating material of claim 1, further comprising at least one constituent selected from the group consisting of compounds, oligomeric compounds, polymeric compounds, and combinations thereof other than the at least one binder, and which contain on average per molecule at least one of
   (i) at least one reactive functional group which can undergo thermally initiated crosslinking reactions with complementary reactive functional groups, or
   (ii) at least one reactive functional group having at least one bond which can be activated with actinic radiation.

21. The coating material of claim 1, wherein the coating material contains from 0.2 to 5% by weight, based on the solids of the coating material, of at least one photoinitiator.

22. The coating material of claim 1, further comprising at least one additive selected from the group consisting of physically curable binders other than the at least one binder; thermally curable reactive diluents; molecularly disperseable soluble dyes; light stabilizers; UV absorbers; reversible free-radical scavengers; antioxidants; organic solvents; devolatilizers; wetting agents; emulsifiers; slip additives; polymerization inhibitors; thermal crosslinking catalysts; thermolabile free-radical initiators; adhesion promoters; leveling agents; film formation auxiliaries; rheological aids; thickeners; pseudoplastic sag control agents; flame retardants; corrosion inhibitors; free-flow aids; waxes; siccatives; biocides; flatting agents, and combinations thereof.

23. The coating material of claim 1, further comprising at least one pigment selected from the group consisting of organic pigments, inorganic pigments, transparent pigments, hiding pigments, color and/or effect pigments, electrically conductive pigments, magnetically shielding pigments, fluorescent pigments, fillers, nanoparticles other than the nanoparticle modified with the at least one compound of general formula I, and combinations thereof.

24. A method comprising applying the coating material of claim 1 a substrate and forming one of a coating, an adhesive, or a seal.

25. The method of claim 24, wherein the coating is a single-coat or multicoat clearcoat system or a multicoat color and/or effect paint system, and the adhesive is an adhesive film.

26. The method of claim 24, wherein the substrate is one of a motor vehicle body, a motor vehicle part, a building, a door, a window, furniture, a part, a coil, a container, a packaging, an electrical component, or a white good.

27. A coating material, curable thermally and with actinic radiation, comprising
(A) at least one binder comprising a (meth)acrylate copolymer having a glass transition temperature of from −35° C. to +40° C., and comprising on average per molecule, at least one reactive functional group having at least one bond which can be activated with actinic radiation, the (meth)acrylate copolymer (A) further containing in copolymerized form an amount of hydroxyl-containing olefinically unsaturated monomers, of which
  (a1) from 22 to 85% by weight, based on the hydroxyl-containing olefinically unsaturated monomers, are selected from the group consisting of 4-hydroxybutyl (meth)acrylate, 2-alkylpropane-1,3-diol mono(meth)-acrylate, and combinations thereof,
  (a2) from 15 to 78% by weight, based on the hydroxyl-containing olefinically unsaturated monomers, are selected from the group consisting of other hydroxyl-containing unsaturated monomers and
(B) nanoparticles modified with at least one compound of general formula I:

$$[(S-)_o\text{-}L\text{-}]_{n}\text{-}M\text{-}(-X-R)_{m-n} \quad (I),$$

wherein
S is a reactive functional group having at least one double carbon bond which can be activated with actinic radiation;
L is at least one divalent organic linking group;
X independently at each occurrence, is an oxygen atom, sulfur atom or >NR$^1$, where R$^1$=hydrogen atom or alkyl group having from 1 to 4 carbon atoms;
M is a metal atom;
R is a monovalent organic radical;
o is an integer from 1 to 5;
m is 3 or 4;
n is 1 or 2 if m=3, and
n is 1,2 or 3 if m=4; and
the coating composition further comprising from 0.2 to 5% by weight, based on the solids of the coating material, of at least one photoinitiator.

28. A coating material, curable thermally and with actinic radiation, comprising
(A) at least one binder comprising a (meth)acrylate copolymer having a glass transition temperature of from −35° C. to +40° C. and containing in copolymerized form an amount of hydroxyl-containing olefinically unsaturated monomers, of which
  (a1) from 22 to 85% by weight, based on the hydroxyl-containing olefinically unsaturated monomers, are selected from the group consisting of 4-hydroxybutyl (meth)acrylate, 2-alkylpropane-1,3-diol mono(meth)-acrylate, and combinations thereof, and
  (a2) from 15 to 78% by weight, based on the hydroxyl-containing olefinically unsaturated monomers, are selected from the group consisting of other hydroxyl-containing unsaturated monomers;
(B) nanoparticles modified with at least one compound of general formula I:

$$[(S-)_o\text{-}L\text{-}]_{n}\text{-}M\text{-}(-X-R)_{m-n} \quad (I),$$

wherein
S is a reactive functional group having at least one double carbon bond which can be activated with actinic radiation;
L is at least one divalent organic linking group;
X independently at each occurrence, is an oxygen atom, sulfur atom or >NR$^1$, where R$^1$=hydrogen atom or alkyl group having from 1 to 4 carbon atoms;
M is a metal atom;
R is a monovalent organic radical;
o is an integer from 1 to 5;
m is 3 or 4;
n is 1 or 2 if m=3, and
n is 1, 2 or 3 if m=4;
(C) at least one constituent selected from the group consisting of low molecular mass, oligomeric and polymeric compounds which are different than the (meth)acrylate copolymers (A) and which contain on average per molecule
  (i) at least one reactive group which is able to undergo thermally initiated cross-linking reactions with complimentary reactive functional groups and
  (ii) at least one reactive functional group having at least one bond which can be activated with actinic radiation; and
(D) from 0.2 to 5% by weight, based on the solids of the coating material, of at least one photoinitiator.

29. The coating material of claim 1, wherein M comprises boron, aluminum, gallium or silicon.

* * * * *